(12) United States Patent
Miller

(10) Patent No.: US 6,984,408 B2
(45) Date of Patent: Jan. 10, 2006

(54) PASTRY FAT COMPOSITION INCORPORATING BOTANICALLY DERIVED UNHYDROGENATED OILS

(76) Inventor: Van Miller, P.O. Box #100, Norval Ontario (CA) L0P 1A0

( * ) Notice: Subject to any disclaimer, the term of this patent is extended or adjusted under 35 U.S.C. 154(b) by 0 days.

(21) Appl. No.: 10/445,875

(22) Filed: May 28, 2003

(65) Prior Publication Data

US 2004/0241308 A1    Dec. 2, 2004

(51) Int. Cl.
*A23D 9/007*    (2006.01)

(52) U.S. Cl. ..................... 426/607; 426/601

(58) Field of Classification Search ........... 426/606, 426/607, 594, 601
See application file for complete search history.

(56) References Cited

U.S. PATENT DOCUMENTS

| | | | |
|---|---|---|---|
| 4,622,226 A | 11/1986 | Ke et al. | |
| 5,080,915 A | 1/1992 | Zock | |
| 5,221,546 A * | 6/1993 | Moore et al. | 426/275 |
| 5,395,638 A * | 3/1995 | Kincs et al. | 426/556 |
| 5,409,723 A * | 4/1995 | Okutomi et al. | 426/559 |
| 5,466,476 A * | 11/1995 | Finkel et al. | 426/556 |
| 5,780,084 A * | 7/1998 | Degli Angeli et al. | 426/242 |
| 6,217,920 B1 * | 4/2001 | van Eendenburg et al. | 426/94 |
| 6,248,388 B1 * | 6/2001 | van Eendenburg et al. | 426/556 |
| 6,312,752 B1 * | 11/2001 | Lansbergen et al. | 426/607 |
| 6,743,458 B2 * | 6/2004 | Trout et al. | 426/582 |
| 6,777,018 B2 * | 8/2004 | Floeter et al. | 426/603 |
| 2001/0010830 A1 * | 8/2001 | van Eendenburg | |
| 2001/0022984 A1 | 9/2001 | Ferrari-Phili et al. | |
| 2002/0106426 A1 * | 8/2002 | Trout et al. | |
| 2002/0106438 A1 * | 8/2002 | Trout et al. | |
| 2003/0021877 A1 * | 1/2003 | Cain et al. | |

* cited by examiner

*Primary Examiner*—Carolyn Paden

(57) ABSTRACT

A pastry fat composition and a method of preparing a puff pastry with improved lift and flakiness using such a pastry fat composition are provided. The pastry fat composition comprises botanically derived unhydrogenated oil; long chain unhydrogenated vegetable oil; hard wheat flour; liquid, and lecithin.

15 Claims, No Drawings

PASTRY FAT COMPOSITION INCORPORATING BOTANICALLY DERIVED UNHYDROGENATED OILS

FIELD OF THE INVENTION

This invention relates to puff pastries and, more particularly, relates to a pastry fat composition which may be used in the preparation of puff pastries; and to methods for preparing the pastry fat composition, and for preparing puff pastries for human consumption.

BACKGROUND OF THE INVENTION

Among the variety of bakery products, puff pastries are quite unique. Puff pastries are laminated products with a distinctly layered structure. They are very light, and flaky. During baking, puff pastries can significantly increase in height, typically up to eight-fold. In order to form the distinct layered structure, the puff pastry dough consists of many layers of sheeted dough separated by layers of fat.

During the baking process, steam is formed from the water component in the puff pastry dough. When the water evaporates, the dough layers expand. The dough layers are insulated by the fat layers. Such a layering structure of the puff pastry dough allows each of the dough layers and fat layers to cook individually, puffing the pastry. Furthermore, as the gluten in the flour component coagulates in the preparation process, it permits the baked puff pastries to form into a light open structure with fine layers.

For centuries, Danish and French puff pastries have been made from animal fats or oils displaying certain plastic properties which would enable the fat or oil to be layered or laminated, thus creating a flaky pastry. Butter was commonly used, followed by blends of beef fats, lard, and marine oil. However, since about twenty five years ago, medical research has shown that consumption of large amounts of animal fat has major effects upon human health. Due to such medical concerns, the baking industry has pushed for the use of vegetable oil as a replacement.

Since many cooking applications, particularly baked products, require the use of solid fats, the food industry hydrogenates the vegetable oils to produce margarines, shortenings, shortening oils, and partially hydrogenated vegetable oils. Hydrogenation allows manufacturers to start with inexpensive, readily available oils and to turn these into products that compete with butter in spreadabillity and organoleptic quality. As is known to those skilled in the art, spreadability is used to describe products having plastic properties.

In hydrogenation, vegetable oils are exposed to hydrogen at a high temperature and in the presence of a catalyst. At the molecular level, when complete hydrogenation occurs, all the double bonds in the oil are saturated with hydrogen. When partial hydrogenation occurs, only some of the double bonds in the oil are converted into single bonds, while other double bonds are converted from the cis- to trans-configuration. Both of these effects straighten out the molecules so they can lie closer together and become solid rather than liquid.

Unfortunately, margarines, shortenings, shortening oils and partially hydrogenated vegetable oils which are produced from hydrogenation of oils contain large quantities of trans-fatty acids and other altered fat substances which have also been found to be detrimental to human health because they interfere with normal biochemical processes. In fact, consumption of hydrogenated fats increases a person's cholesterol level. Studies have found that large consumption of trans-fatty acids, in particular, causes an increase in cholesterol, decrease in beneficial high-density lipoprotein (HDL), interfere with the liver's detoxification system, and interfere with essential fatty acid (EFA) function. Despite these known medical concerns, the food industry still continues to use the hydrogenation process as it allows cheap oils to be turned into semi-liquid, plastic, or solid fats with specific organoleptic properties, texture, spreadability and very long shelf-life. In fact, the shelf-life of such hydrogenated and partially hydrogenated fats and oils are so extensive as compared to unhydrogenated fat and oil that those of skilled in the art have coined the term "dead" to these hydrogenated fats and oils. Due to the stability of these hydrogenated fats and oils, they are very difficult to break down in the human's digestive system. Thus, over time, these substances become detrimental to the human's health. However, hydrogenated fats and oils are favoured by the food industries as they do not spoil easily as compared to unhydrogenated fats and oils, which are much more marketable from the manufacturers' point of view.

Although butter has a small amount of trans-fatty acids which are created in the ruminant part of the cow's digestive system, research has indicated that such natural trans-fatty acids, which are not created from hydrogenation, are less detrimental to the human health.

Choosing a suitable fat system for use in puff pastries, in particular, is difficult. The baking industry recognizes that many consumers are concerned with the presence of hydrogenated or partially hydrogenated fats or oils in baked products, and puff pastries are no exception. Another difficulty in choosing a suitable fat relates to the melting point of such a fat system. It has been found that if the melting point of the fat system incorporated in the pastry dough is far beyond the human body temperature, the baked products obtained would have a waxy and unpleasant "mouth feel".

In the recent past, the fat system incorporated in the puff pastry dough is typically 100% beef tallow, 100% of vegetable oil, or a mixture of the two. Before the fat is rolled into the dough, the roll-in type fats would have to be "chill roll" cooled such that when kneaded with the dough, a plasticity characteristic of the dough is obtained.

In U.S. Pat. No. 5,780,084 issued to DEGLI ANGELI et al. on Jul. 14, 1998, a process for preparing layered and puffed pastry products is taught. The process includes producing a dough by mixing a raw material with water in which the raw material does not contain a wheat flour, shaping the dough into a plurality of layers so as to obtain a layered dough, baking the layered dough in a thermocycle oven and drying the baked layered dough with microwaves, radio waves or infrared waves to obtain a layered and puffed pastry product.

In U.S. patent application Ser. No. 2001/0022984 A1 published by FERRARI-PHILIPPE et al. on Sep. 20, 2001, a process for the preparation of a dough for obtaining a puff pastry type product is taught. The process includes the steps of: (a) combining flour, salt, acidic proteins and an inactivated fermentation agent at room temperature; (b) adding lumps of fat to the mixture in step (a) to obtain a heterogeneous dough; (c) incorporating water into the dough; (d) extruding the dough; and (e) storing the puff pastry obtained at a temperature of −40 to +10° C.

In U.S. Pat. No. 5,080,915 issued to ZOCK on Jan. 14, 1992, a method for preparing a puff pastry in which the puff pastry is formed using flour while adding water and a fat composition is taught. The fat composition comprises fat and vegetable fibre material in a weight ratio between 1:1 and 20:1 in which the vegetable fibre material is wheat bran.

In U.S. Pat. No. 4,622,226 issued to KE et al. on Nov. 11, 1986, a process for producing a puff pastry is taught. The puff pastry is made from a multi-layered laminate which comprises alternating layers of a dough and a roll-in shortening. The flour in the dough is partially substituted with dextrin such as tapioca dextrin, potato dextrin, sago dextrin, wheat dextrin, sorgum dextrin, and corn dextrin.

It will be apparent from the foregoing prior art that the plasticity property of the puff pastry is obtained from hydrogenated and/or partially hydrogenated fat or oil.

SUMMARY OF THE INVENTION

It is an object of the present invention to provide a novel pastry fat composition, and a method of preparation of a puff pastry using such pastry fat composition which obviates or mitigates the disadvantages of the prior art.

In accordance with one aspect of the present invention, a pastry fat composition for use in the preparation of puff pastry is provided. The pastry fat composition comprising botanically derived unhydrogenated oil in a proportion of about 20 to 70% by weight; long chain unhydrogenated vegetable oil in a proportion of about 10 to 50% by weight; hard wheat flour in a proportion of about 5 to 35% by weight, and having 10 to 15% by weight protein; liquid in a proportion of about 3 to 40% by weight; and lecithin in a proportion of about 0.2 to 1.5% by weight.

In one embodiment of the present invention, the pastry fat composition further comprises a butter flavouring ingredient in a proportion of about 0.05 to 1% by weight. Preferably, the butter flavouring ingredient is in a proportion of about 0.1 to 1% by weight of the pastry fat composition. Typically, the butter flavouring ingredient used in the pastry fat composition is diacetyl.

In another embodiment, the pastry fat composition further comprises up to 5% by weight of salt.

In yet another embodiment, the pastry fat composition further comprises a sweetener in a proportion of about 1 to 15% by weight. The sweetener is chosen from the group consisting of sugar, glucose, and combinations and mixtures thereof.

Typically, the botanically derived unhydrogenated oil is chosen from the group consisting of palm oil, shea butter, illippe butter, Borneo tallow, and combinations and mixtures thereof.

The long chain unhydrogenated vegetable oil is typically chosen from the group consisting of soya oil, canola cottonseed oil, corn oil, olive oil and combinations and mixtures thereof.

The liquid may be chosen from the group consisting of milk, water, and combinations and mixtures thereof.

The lecithin may be derived from sources chosen from the group consisting of egg yolks, whole eggs, synthetic, natural, and combinations and mixtures thereof.

In another aspect of the present invention, a method of preparing a pastry fat composition comprises the step of mixing together below a temperature of about 30° C. botanically derived unhydrogenated oil in a proportion of about 20 to 70% by weight; long chain unhydrogenated vegetable oil in a proportion of about 10 to 50% by weight; hard wheat flour in a proportion of about 5 to 35% by weight; liquid in a proportion of about 3 to 40% by weight; and lecithin in a proportion of about 0.2 to 1.5% by weight. Typically, 10 to 15% by weight of the hard wheat flour is protein.

In yet another aspect of the present invention, a further method of preparing a pastry fat composition is provided. The method comprises the steps of:

(a) mixing together hard wheat flour in a proportion of about 5 to 35% by weight, and liquid in a proportion of about 3 to 40% by weight;

(b) boiling the mixture of step (a) until the hard wheat flour is coagulated;

(c) cooling the mixture to below 30° C.; and (d) combining and blending the mixture with botanically derived unhydrogenated oil in a proportion of about 20 to 70% by weight; long chain unhydrogenated vegetable oil in a proportion of about 10 to 50% by weight; hard wheat flour in a proportion of about 5 to 35% by weight; liquid in a proportion of about 3 to 40% by weight; and lecithin in a proportion of about 0.2 to 1.5% by weight. Typically, 10 to 15% by weight of the hard wheat flour is protein.

In yet a further aspect of the present invention, a puff pastry dough is provided. The puff pastry dough comprises a pastry fat composition in a proportion of about 40 to 50% by weight of the dough, together with hard wheat four in a proportion of about 40 to 50% by weight, water in a proportion of about 1 to 30% by weight, and salt in a proportion up to 0.012% by weight.

Still, in a further aspect of the present invention, a method of preparing a puff pastry having improved lift and flakiness is provided. The method of preparing the puff pastry comprises the following steps:

(a) preparing the puff pastry dough composition below a temperature of about 30° C.;

(b) rolling the dough to disperse the pastry fat composition throughout;

(c) repeating step (b) a predetermined number of times while permitting the puff pastry dough to rest for a period of about 3 seconds to 5 minutes between each repetition of step (b) so as to permit the gluten component of the hard wheat flour to relax;

(d) sheeting and folding the puff pastry dough a predetermined number of times;

(e) shaping the puff pastry dough into a desired shape; and (f) baking the puff pastry dough of step (e) at a predetermined temperature and for a predetermined period of time.

Thus, there is provided a puff pastry which comprises a pastry fat composition having unhydrogenated fats and/or oils, and which assures that the puff pastry dough will have a plastic quality. Further, the pastry fat composition has a melting point which is in line with the human body temperature, thus providing a pleasant "mouth feel" and organoleptic quality when the puff pastry is consumed. Still further, the puff pastry provided from the use of such pastry fat composition of the present invention has improved lift and flakiness.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

The present invention provides a pastry fat composition and a method of preparing a puff pastry having such a pastry fat composition. The puff pastry provided by the present invention has improved lift and flakiness. The present invention also provides a puff pastry dough which may be used to prepare such puff pastry products as danishes, croissants, tarts, pies, turnovers, and the like.

In accordance with one aspect of the present invention, a pastry fat composition for use in the preparation of a puff pastry is provided. The pastry fat composition comprises botanically derived unhydrogenated oil in a proportion of about 20 to 70% by weight; long chain unhydrogenated vegetable oil in a proportion of about 10 to 50% by weight; hard wheat flour in a proportion of about 5 to 35% by weight, and having 10 to 15% by weight protein; liquid in a proportion of about 3 to 40% by weight; and lecithin in a proportion of about 0.2 to 1.5% by weight.

In a preferred embodiment of the present invention, the botanically derived unhydrogenated oil is in a proportion of 30 to 60% by weight, the long chain unhydrogenated oil is in a proportion of 15 to 40% by weight, the hard wheat flour is in a proportion of 10 to 30% by weight, the liquid is in a proportion of 5 to 35% by weight, and the lecithin is in a proportion of 0.3 to 0.8% by weight of the pastry fat composition.

Generally, the flour used having a protein content of about 10 to 15% by weight of the flour. Flour of this kind is referred to as rich in gluten. The importance of having flour rich in gluten is discussed hereafter.

In one embodiment of the pastry fat composition of the present invention, the pastry fat composition further comprises a butter flavouring ingredient in a proportion of about 0.05 to 1% by weight. Preferably, the butter flavouring ingredient is in a proportion of about 0.1 to 1% by weight. Typically, the butter flavouring ingredient is diacetyl.

In another embodiment of the present invention, the pastry fat composition further comprises up to 5% by weight of salt.

In yet another embodiment of the present invention, the pastry fat composition further comprises a sweetener in a proportion of about 1 to 15%. The sweetener is chosen from the group consisting of sugar, glucose, and combinations and mixtures thereof.

Turning to a discussion of the pastry fat composition presence in existing puff pastry product, it was previously discussed noted that the prior pastry fat compositions used typically comprised hydrogenated and/or partially hydrogenated fats and oils which are detrimental to human health. Quite unexpectedly, the present inventor has discovered that by using certain botanically derived unhydrogenated oils, in the fat composition of the puff pastry, the organoleptic quality of butter, lard, and other hydrogenated and/or partially hydrogenated fat and oils may be replicated.

Typically, the botanically derived unhydrogenated oil of the pastry fat composition is chosen from the group consisting of palm oil, shea butter, illippe butter, Borneo tallow, and combinations and mixtures thereof.

The above botanically derived unhydrogenated oils are typically used in the preparation of cosmetics. Surprisingly, the present inventor has discovered that since the melting point of these botanically derived unhydrogenated oils is in line with the human body temperature, then these botanically derived unhydrogenated oils may be used in the pastry fat composition of the puff pastry, such that they contribute to a pleasant "mouth feel" of the puff pastry when consumed. Thus, the organoleptic properties of puff pastries prepared in keeping with the present invention are the equivalent of those that are prepared using butter, or other naturally occurring animal fats, as their fat system component.

The long chain unhydrogenated vegetable oil of the pastry fat composition may be soya oil, canola cottonseed oil, corn oil, olive oil and combinations and mixtures thereof.

In view of the above, the present inventor has unexpectedly discovered that by using such unhydrogenated oils, puff pastry products may be obtained which obviate the disadvantages of using hydrogenated and/or partially hydrogenated fats and/or oils which are typically used in existing puff pastry products. By precluding the use of hydrogenated and/or partially hydrogenated fats and/or oils, a puff pastry product prepared by the present invention contains little or no saturated fats and/or trans-fatty acids. Thus, a healthier puff pastry product may be obtained. At the same time, the present inventor is able to replicate the organoleptic property of real butter and lard in the puff pastry product prepared from such unhydrogenated oils such that the consumer still obtains the pleasant "mouth feel" when eating the puff pastry product of the present invention.

The liquid typically used in the pastry fat composition is chosen from the group consisting of milk, water, and combinations and mixtures thereof.

In the pastry fat composition, the lecithin is typically derived from egg yolks, and/or whole eggs. However, the lecithin may also be synthetically prepared, from a natural source, and combinations and mixtures thereof.

In one aspect of the present invention, a method of preparing a pastry fat composition is provided. The method comprises the step of mixing together botanically derived unhydrogenated oil in a proportion of about 20 to 70% by weight, long chain unhydrogenated vegetable oil in a proportion of about 10 to 50% by weight, hard wheat flour in a proportion of about 5 to 35% by weight, liquid in a proportion of about 3 to 40% by weight, and lecithin in a proportion of about 0.2 to 1.5% by weight, at a temperature below 30° C.—typically, at about room temperature.

In another aspect of the present invention, the method of preparing the pastry fat composition comprises the steps of:

(a) mixing together hard wheat flour in a proportion of about 5 to 35% by weight, and liquid in a proportion of about 3 to 40% by weight;

(b) boiling the mixture of step (a) until the hard wheat flour is coagulated;

(c) cooling the mixture to below 30° C.; and (d) combining and blending the mixture with botanically derived unhydrogenated oil in a proportion of about 20 to 70% by weight, long chain unhydrogenated vegetable oil in a proportion of about 10 to 50% by weight, hard wheat flour in a proportion of about 5 to 35% by weight, liquid in a proportion of about 3 to 40% by weight, and lecithin in a proportion of about 0.2 to 1.5% by weight.

By first boiling the flour and water before combining with the remaining ingredients of the pastry fat composition, the flour becomes completely coagulated, thus providing the flour water mixture with a very tough consistency. As a result, a baked puff pastry prepared from such pastry fat composition is a very viscous and plastic product with excellent lift and volume.

In order to form a puff pastry dough, the pastry fat composition in a proportion of about 40 to 50% by weight of the dough is mixed together with hard wheat four in a proportion of about 40 to 50% by weight, water in a proportion of about 1 to 30% by weight, and salt in a proportion up to 0.012% by weight.

An example of a puff pastry dough used in the preparation of the puff pastry of the present invention is shown below:

| Non-Fat Dough portion: | |
|---|---|
| Hard wheat flour | 10 kg |
| Cold water | 3 L |
| Salt | 0.1 kg |
| Pastry Fat composition: | |
| palm oil | 5 kg |
| soya oil | 1.5 kg |
| water | 0.5 L |
| hard wheat flour | 1.5 kg |
| lecithin (derived from egg yolks) | 0.050 kg |

In another example of the puff pastry dough, the palm oil and soya oil in the pastry fat composition may be replaced with a blend of various weight percentages of butter or butter oil. For instance, the pastry fat composition may have 50% by weight butter and 50% by weight of a vegetable oil. Since butter is used in this particular example of the puff pastry dough, a large amount of trans-fatty acids will be present. However, since such trans-fatty acids are naturally occurring in the butter system, they are typically considered to be unhydrogenated fat by those skilled in the art.

In a further aspect of the present invention, a method of preparing a puff pastry having improved lift and flakiness is provided. The method comprises the following steps of:

(a) preparing the puff pastry dough composition as discussed above, at a temperature of about 30° C.;

(b) rolling the dough to disperse the pastry fat composition throughout;

(c) repeating step (b) a predetermined number of times while permitting the puff pastry dough to rest for a period of about 3 seconds to 5 minutes between each repetition of step (b) so as to permit the gluten component of the hard wheat flour to relax;

(d) sheeting and folding the puff pastry dough a predetermined number of times;

(e) shaping the puff pastry dough into a desired shape; and (f) baking the puff pastry dough of step (e) at a predetermined temperature and for a predetermined period of time.

Typically, in step (d), the laminated pastry dough is sheeted in what is called 1×3 and two book fold (×4) to yield a total of 48 layers of lamination as is known to those skilled in the art.

The puff pastry dough may be baked to completion, or it may be parbaked and then frozen for storage. In the latter case, when consumption of the puff pastry is desired, the consumer can heat the puff pastry in a microwave oven or further bake the puff pastry in a conventional oven.

In order to provide a puff pastry product with improved lift and flakiness, it is important to note that the pastry dough needs to be rested intermittently during the rolling process such that the gluten component of the hard wheat flour is permitted to stretch and relax.

As was previously discussed, the flour used in the preparing of such a puff pastry is typically rich in gluten. Gluten is a mixture of wheat proteins which provides the tough, rubbery, elastic consistency when the flour is mixed with a liquid. During the baking process, the gluten forms a network which in turn expands with the evaporation of water into steam. The expansion continues during the baking process until the structure of the gluten is denatured by the heat of the oven. Further, the gluten causes the steam produced during the baking process to be retained by the pastry dough such that the distinct layered structure of the puff pastry is obtained.

While only specific combinations of various features and components of the present invention have been discussed herein, it will be apparent to those skilled in the art that desired subsets of the disclosed features and components and/or alternative combinations of these features and components can be utilized, as desired.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A pastry fat composition for use in the preparation of puff pastry, said pastry fat composition comprising:
   botanically derived unhydrogenated oil having a melting point in line with human body temperature in a proportion of about 20 to 70% by weight;
   long chain unhydrogenated vegetable oil in a proportion of about 10 to 50% by weight;
   coagulated hard wheat flour in a proportion of about 5 to 35% by weight, and having 10 to 15% by weight protein;
   liquid in a proportion of about 3 to 40% by weight; and
   lecithin in a proportion of about 0.2 to 1.5% by weight.

2. The pastry fat composition of claim 1, wherein said botanically derived unhydrogenated oil is in a proportion of 30 to 60% by weight, wherein said long chain unhydrogenated oil is in a proportion of 15 to 40% by weight, wherein said hard wheat flour is in a proportion of 10 to 30% by weight, wherein said liquid is in a proportion of 5 to 35% by weight, end wherein said lecithin is in a proportion of 0.3 to 0.8% by weight.

3. The pastry fat composition of claim 1, further comprising a butter flavouring ingredient in a proportion of about 0.05 to 1% by weight.

4. The pastry fat composition of claim 3, wherein said butter flavouring ingredient is in a proportion of about 0.1 to 1% by weight.

5. The pastry fat composition of claim 3, wherein said butter flavouring ingredient is diacetyl.

6. The pastry fat composition of claim 1, further comprising up to 5% by weight of salt.

7. The pastry fat composition of claim 1, further comprising a sweetener in a proportion of about 1 to 15%, wherein said sweetener is chosen from the group consisting of sugar, glucose, and combinations and mixtures thereof.

8. The pastry fat composition of claim 1, wherein said botanically derived unhydrogenated oil is chosen from the group consisting of palm oil, shea butter, illippe butter, Bomeo tallow, and combinations and mixtures thereof.

9. The pastry fat composition of claim 1, wherein said long chain unhydrogenated vegetable oil is chosen from the group consisting of soya oil, canola cottonseed oil, corn oil, olive oil and combinations and mixtures thereof.

10. The pastry fat composition of claim 1, wherein said liquid is chosen from the group consisting of milk, water, and combinations and mixtures thereof.

11. The pastry fat composition of claim 1, wherein said lecithin is derived from sources chosen from the group consisting of egg yolks, whole eggs, synthetic, natural, and combinations and mixtures thereof.

12. A puff pastry dough comprising the pastry fat composition of claim 1 in a proportion of about 40 to 50% by weight of said dough, together with hard wheat flour in a proportion of about 40 to 50% by weight, water in a proportion of about 1 to 30% by weight, and salt in a proportion up to 0.012% by weight.

13. A method of preparing a puff pastry having improved lift and flakiness, comprising the following steps:
(a) preparing the puff pastry dough composition of claim 12 below a temperature of about 30° C.;
(b) rolling the dough to disperse the pastry fat composition throughout;
(c) repeating step (b) a predetermined number of times white permitting the puff pastry dough to rest for a period of about 3 seconds to 5 minutes between each repetition of step (b) so as to permit the gluten component of the hard wheat flour to relax;
(d) sheeting and folding the puff pastry dough a predetermined number of times;
(e) shaping the puff pastry dough into a desired shape; and
(f) baking the puff pastry dough of step (e) at a predetermined temperature and for a predetermined period of time.

14. A method of preparing a pastry fat composition, comprising the step of:
mixing together below a temperature of about 30° C. botanically derived unhydrogenated oil having a melting point in line with human body temperature in a proportion of about 20 to 70% by weight, long chain unhydrogenated vegetable oil in a proportion of about 10 to 50% by weight, coagulated hard wheat flour in a proportion of about 5 to 35% by weight, liquid in a proportion of about 3 to 40% by weight, and lecithin in a proportion of about 0.2 to 1.5% by weight;
wherein 10 to 15% by weight of the hard wheat flour is protein.

15. A method of preparing a pastry fat composition, comprising the steps of:
(a) mixing together hard wheat flour in a proportion of about 5 to 35% by weight, and liquid in a proportion of about 3 to 40% by weight;
(b) boiling the mixture of step (a) until hard wheat flour is coagulated;
(c) cooling the mixture to below 30° C.; and
(d) combining and blending the mixture with botanically derived unhydrogenated oil having a melting point in line with human body temperature in a proportion of about 20 to 70% by weight, long chain unhydrogenated vegetable oil in a proportion of about 10 to 50% by weight, coagulated hard wheat flour in a proportion of about 5 to 35% by weight, liquid in a proportion of about 3 to 40% by weight, and lecithin in a proportion of about 0.2 to 1.5% by weight;
wherein 10 to 15% by weight of said hard wheat flour is protein.

* * * * *